Figure 7:
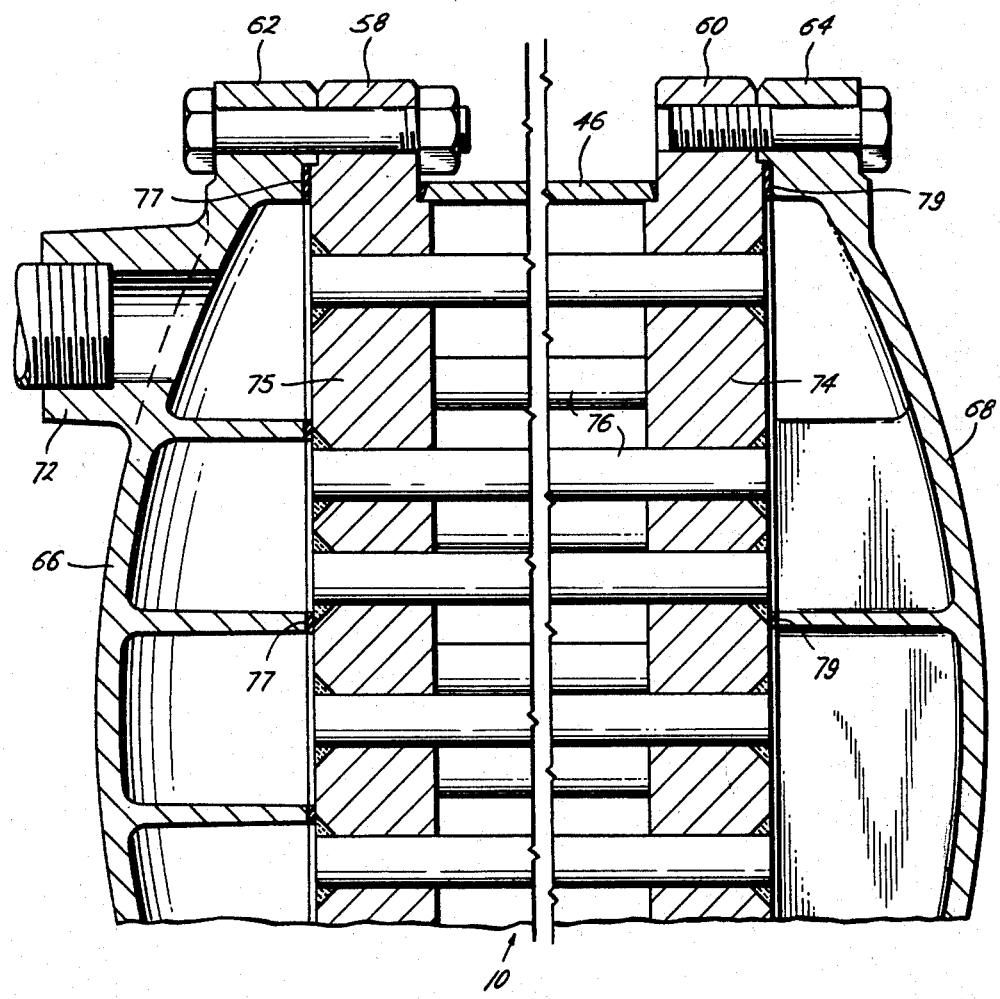

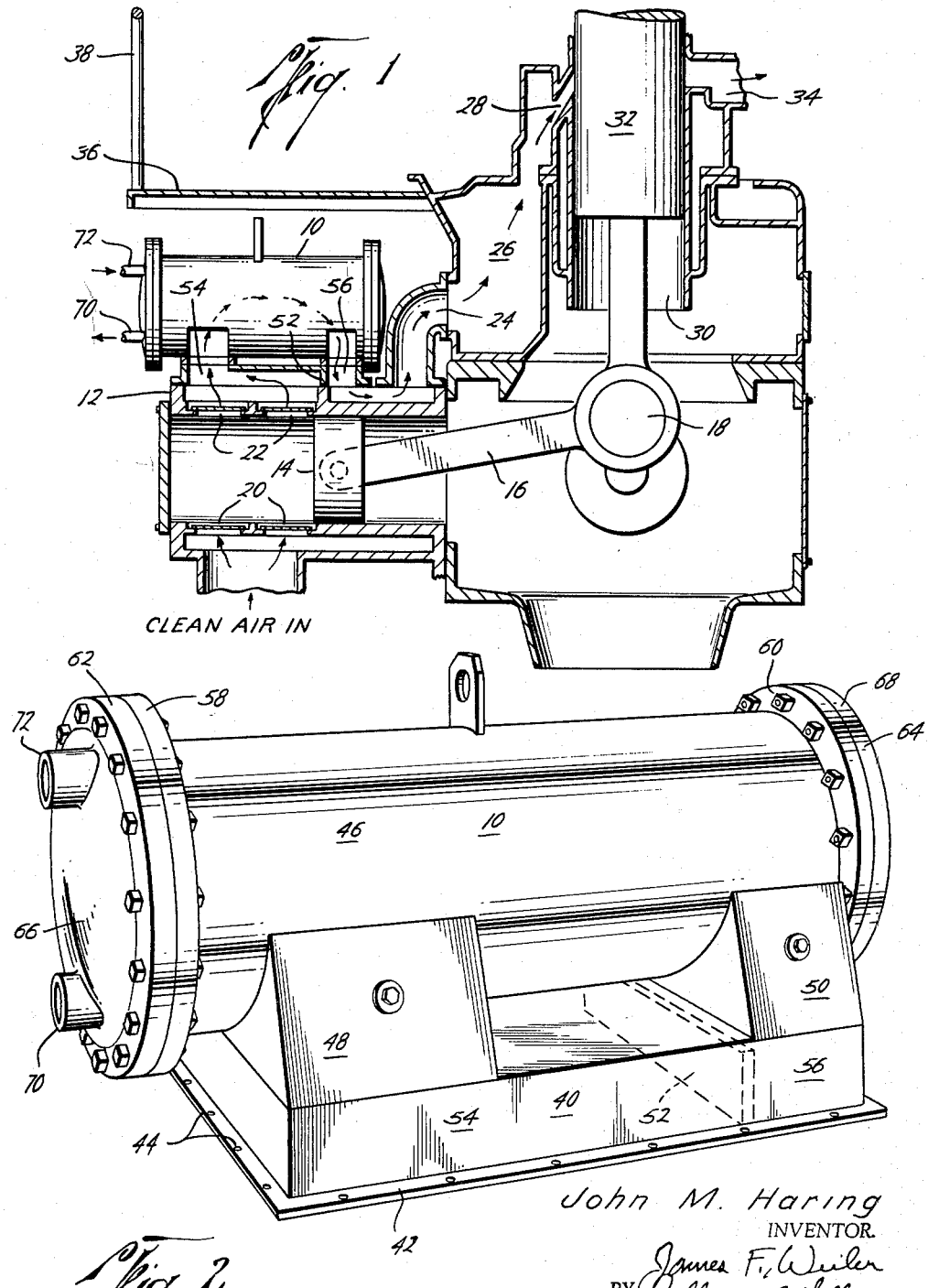

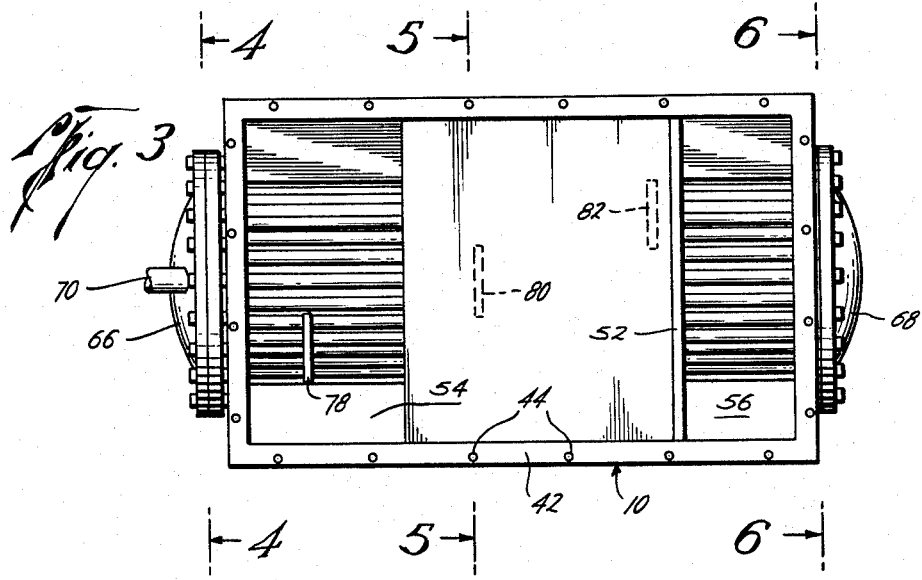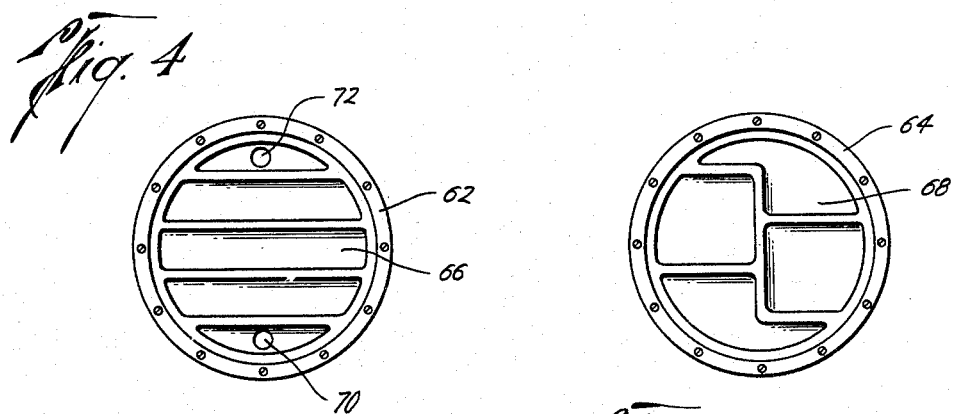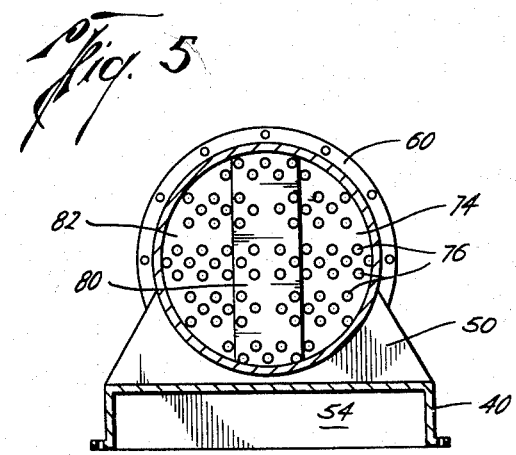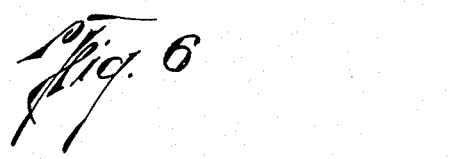

April 20, 1965 J. M. HARING 3,179,092
SCAVENGING AIR COOLER
Filed Aug. 7, 1963 3 Sheets-Sheet 3

John M. Haring
INVENTOR.
BY
ATTORNEYS

United States Patent Office 3,179,092
Patented Apr. 20, 1965

3,179,092
SCAVENGING AIR COOLER
John M. Haring, P.O. Box 22587, Houston, Tex.
Filed Aug. 7, 1963, Ser. No. 300,435
3 Claims. (Cl. 123—72)

The present invention relates to improvements in scavenging air coolers particularly for two-cycle engines.

The beneficial effects of cooling scavenging air have been known and recognized by owners and operators of two-stroke cycle engines for a long time. These include the elimination of detonation, reduction of fuel consumption, increase of available horse power, reduction of heat rejection to water jacket and the lube oil system, reduction of exhaust gas temperature and reduction of required fuel pressures. In practice there has been no practical solution to the problem of cooling large quantities of air at low pressure and at high intermittent flow rates within the space limitations available. This is a major reason why scavenging air coolers for two-stroke cycle engines have not been universally accepted. The present invention is directed toward a scavenging air cooler for two-stroke cycle engines which provides a solution to this problem of cooling large quantities of air at low pressure and at high intermittent flow rates within the available space limitations.

It is therefore an object of the present invention to provide an air cooler for cooling large quantities of scavenging air at low pressure and at high intermittent flow rates for two-stroke cycle engines within the available space limitation.

Yet a further object of the present invention is to provide such a scavenging air cooler which eliminates detonation, reduces fuel consumption, increases available horsepower, reduces heat rejection to water jacket and lube oil system, reduces exhaust gas temperature and reduces required fuel pressures.

Yet a further object of the present invention is the provision of an air cooler for cooling large quantities of scavenging air at low pressure and at high intermittent flow rates to a temperature of less than 140° F. for two-stroke cycle engines within the available space limitation.

Yet a further object of the present invention is the provision of such an air cooler for cooling scavenging air of two-stroke cycle engines within the available space limitations which is inexpensive, of simple and rugged construction and which may be readily and easily installed on existing two-stroke cycle engines.

Yet a further object of the present invention is the provision of such a cooler for scavenging air which cools large quantities of surging air with a minimum of vibration.

Other and further objects, features and advantages will be apparent from the following description of a presently-preferred embodiment of the invention, given for the purpose of disclosure, and taken in conjunction with the accompanying drawings, where like reference numerals designate like parts throughout the several views, and where FIGURE 1 is a fragmentary elevational view, partly in section, illustrating an air cooler according to the invention installed on a two-stroke cycle engine, FIGURE 2 is an enlarged, perspective view, illustrating the air cooler illustrated in FIGURE 1, FIGURE 3 is a bottom view of the air cooler illustrated in FIGURE 2, FIGURE 4 is a sectional view taken along the line 4—4 of FIGURE 3, FIGURE 5 is a sectional view taken along the line 5—5 of FIGURE 3, FIGURE 6 is a sectional view taken along the line 6—6 of FIGURE 3, FIGURE 7 is an enlarged, fragmentary, elevational view, partly in section, illustrating the header arrangement at each end of the air cooler.

Referring now to the drawings, and particularly to FIGURE 1, the reference numeral 10 generally designates an air cooler according to the invention shown in place on a conventional two-cycle engine. The air cooler 10 is secured about the valve opening at the top portion of the scavenging air pump cylinder 12 provided with the piston 14 connected by the connecting rod to the crank shaft 18 of the engine.

The cooler 10 is secured to the upper portion of the cylinder 12 where the valve covers have been removed, as illustrated, and are connected by bolts, not shown. Thus, clean air entering the cylinder 12 through the inlet valves 20 is pumped through the outlet valves 22 through the air cooler 10 into the inlet 24 passing into the internal scavenging air header 26. The cool scavenging air then passes through the inlet scavenging air passage 28 into the cylinder 30, here shown as being closed by the piston 32 and is exhausted out the exhaust 34 during the scavenging portion of the stroke in the usual manner.

In installations of two-stroke cycle engines, there is ordinarily a catwalk 36 and a railing 38 which severely limits the space into which an air cooler can be placed for cooling the scavenging air. The air cooler 10 by its arrangement and combination of parts permits highly effective cooling of the scavenging air, that is to a temperature of less than 140° F.

While the remaining environmental parts of a conventional two-stroke cycle engine are shown no numerals are applied to these parts as these are conventional, as such do not constitute the present invention, and are eliminated to shorten and simplify the disclosure. Accordingly, no detailed description of the remaining parts of the two-stroke cycle engine are deemed necessary or given.

Referring now to FIGURE 2, the air cooler includes a base 40 which is generally shaped to fit about the opening for the exhaust valves of the cylinder 12 (FIGURE 1) which pumps the scavenging air into the engine. The base 40 has the outwardly extending peripheral flange 42 provided with the holes 44 through which bolts, not shown, extend for securely bolting the air cooler to the cylinder 12.

The air cooler 10 includes a generally cylindrical body 46, although it may otherwise be shaped, such as square, rectangular and the like, and which is secured to the base 40 by the upstanding members 48 and 50 disposed at each end.

The generally rectangular base 40 is open throughout its length except for the partition 52 disposed adjacent the exhaust end of the base 40 which is in line with the internal passage within the upstanding member 50. Thus, air from the cylinder 12 (FIGURE 1) passing through the discharge valves 22 enters into the space 54 within the base 40, flows through the hollow upright member 48 into the body 46 of the air cooler, out through the hollow support member 50 and into the exhaust passage 56 of the base 40.

Disposed at each end of the body 46 are the outwardly extending flanges 58 and 60 to which are secured the flanges 62 and 64 of the end covers 66 and 68, respectively, such as by bolting as illustrated. Preferably the end covers 66 and 68 serve as headers for the cooling fluid and the closure member 66 includes the fluid inlet 70 and fluid outlet 72 through which cooling fluid is supplied to the cooler and recirculated from a suitable cooling source, not shown. The end closure 66 with the cooling header passages is best illustrated in FIGURE 4 and the end closure 68 illustrating the cooler header return passages is best seen in FIGURE 6.

Referring now to FIGURE 7, there are disposed at each end of the body 46, a circular support member 74 and 75 which received the tubes 76 and support these tubes adjacent each end of the body which serve to support the tubes as shown. These support plates 74 are disposed snugly against the water course members of the headers 66 and 68 for directing flow through the tubes 76 and the seals 77 and 79 are provided to seal off the headers in the heads 66 and 68.

The arrangement illustrated is an eight pass cooler in which cooling fluid is introduced in the inlet 70 and circulated through the cooler eight times and out the outlet 72.

Suitable baffles are provided for causing the air entering the cooler in the inlet 54 to be deflected and to obtain the maximum cooling effect from the cooling fluid being circulated in the tubes 74. This is best illustrated in FIGURES 3 and 5, to which reference is now made. As there shown three baffles 78, 80 and 82 are illustrated. These are generally in the shape of a circular disc generally the size of the inner portion of the cylindrical body 46, which disc has been cut into three parts and spaced along the body as shown. These baffles also serve the purpose of supporting the tubes at spaced points and assist in eliminating vibration which otherwise would result from the high intermittent flow rates through the cooler 10.

In operation the cooler 10 is assembled by removing the valve cover plate, not shown, and connecting it to the body of the cylinder 12 as previously mentioned. Air drawn into the cylinder 12 through the inlet valves 20 and out through the outlet valves 22 flow through the passage 54 into the cooler 10 and about the tubes 76 (FIGURES 3, 5 and 7) and out the outlet 56 (FIGURE 1) and into the scavenging air inlet 24 into the scavenging air header 26, the partition 52 serving to direct the air from the cylinder 12 into the cooler 10 as previously explained. Cooling fluid such as water, enters the inlet 70 into the header 66 and is directed back and forth through the cooler 10 in the tubes 76, all as previously explained. The baffles 78, 80 and 82 (FIGURES 3 and 5) effectively deflect the flow of air through the cooler 10 so that maximum cooling of the air is obtained.

By using water at normal temperatures, the temperature of the scavenging air exhausting at 34 (FIGURE 1) is less than 140° F. This eliminates detonation, reduces fuel consumption, increases the available horsepower, reduces the heat rejection to the water jacket and lube oil system, reduces the exhaust gas temperature and reduces the required fuel pressure.

The construction shown and described substantially eliminates vibration, even though large intermittent flow of air is provided.

As previously mentioned, the air cooler may take a wide variety of shapes and forms. The tubes may extend lengthwise, transversely, or otherwise of the body of the air cooler and the body of the air cooler may be integral with or flush with the base 40 as desired. Baffling should be provided to insure effective cooling of the air and to eliminate vibration and provide strength to the air cooler in view of the large surges of pulsating scavenger air being cooled.

Any desired cooling fluid may be used. In view of its general availability, water is preferred, however, in some areas, it may be desirable to utilize other liquids or fluids and recirculate them after they have been cooled by a suitable means.

As many of these coolers may be used with a two-cycle engine as desired, however, the maximum number per engine will be the same as the number of scavenging air cylinders per engine. Under most operating conditions an air cooler for each scavenging piston and cylinder arrangement cools the scavenging air exhausting from the engine to 140° F. and less, which is highly satisfactory.

The present invention, therefore, is well suited and adapted to attain the objects and ends and has the advantages and features mentioned as well as others inherent therein.

While presently-preferred embodiments of the invention have been shown and described, changes in the form, detail and arrangement of parts may be made which are within the spirit of the invention as defined by the scope of the appended claims.

What is claimed is:

1. In an engine provided with a scavenging cylinder, a scavenging cylinder valve communicating with the scavenging cylinder, and a scavenging air inlet into the engine,
   a first passage in the outer wall of the cylinder in fluid communication with the scavenging cylinder valve,
   a second passage in the outer wall of the cylinder in fluid communication with the scavenging air inlet into the engine,
   a heat exchanger connected to the scavenging cylinder, said heat exchanger provided with
   an inlet in fluid communication with the first passage, and
   an outlet in fluid communication with the second passage.

2. In an engine provided with a scavenging cylinder, a scavenging cylinder valve communicating with the scavenging cylinder, and a scavenging air inlet into the engine,
   a first passage in the outer wall of the cylinder in fluid communication with the scavenging cylinder valve,
   a second passage in the outer wall of the cylinder in fluid communication with the scavenging air inlet into the engine,
   a heat exchanger provided with a base connected to the scavenging cylinder,
   an inlet passage in the base in fluid communication with the first passage, and
   an outlet passage in the base in fluid communication with the second passage.

3. In an engine provided with a scavenging cylinder, a scavenging cylinder valve communicating with the scavenging cylinder, and a scavenging air inlet into the engine,
   a first passage in the outer wall of the cylinder in fluid communication with the scavenging cylinder valve,
   a second passage in the outer wall of the cylinder in fluid communication with the scavenging air inlet into the engine,
   a heat exchanger provided with a base, said base being secured to the scavenging cylinder and about the first passage and the second passage, and
   a partition in the base providing a scavenging air inlet in fluid communication with the first passage and a scavenging air outlet in fluid communication with the second passage.

References Cited by the Examiner

UNITED STATES PATENTS

| | | | |
|---|---|---|---|
| 1,537,128 | 5/25 | Mayer | 123—72 |
| 1,821,662 | 9/31 | Muller | 123—72 |

FOREIGN PATENTS 940,064   5/48   France.

FRED E. ENGELTHALER, *Primary Examiner.*